US008958960B2

(12) United States Patent
Wakayama et al.

(10) Patent No.: US 8,958,960 B2
(45) Date of Patent: Feb. 17, 2015

(54) COAST STOP VEHICLE

(75) Inventors: Hideshi Wakayama, Hadano (JP);
Noritaka Aoyama, Atsugi (JP);
Kousuke Waku, Hadano (JP); Hiroyasu Tanaka, Atsugi (JP); Keichi Tatewaki, Atsugi (JP)

(73) Assignee: Jatco Ltd, Fuji-shi (JP)

( * ) Notice: Subject to any disclaimer, the term of this patent is extended or adjusted under 35 U.S.C. 154(b) by 0 days.

(21) Appl. No.: 14/240,618

(22) PCT Filed: Jul. 19, 2012

(86) PCT No.: PCT/JP2012/068265
§ 371 (c)(1),
(2), (4) Date: Feb. 24, 2014

(87) PCT Pub. No.: WO2013/031409
PCT Pub. Date: Mar. 7, 2013

(65) Prior Publication Data
US 2014/0207348 A1    Jul. 24, 2014

(30) Foreign Application Priority Data

Aug. 31, 2011   (JP) .................................. 2011-188283

(51) Int. Cl.

| G06F 7/00 | (2006.01) |
|---|---|
| G06F 17/00 | (2006.01) |
| G06F 19/00 | (2011.01) |
| B60W 10/06 | (2006.01) |
| F16H 61/00 | (2006.01) |
| F02D 17/00 | (2006.01) |

(Continued)

(52) U.S. Cl.
CPC .............. *B60W 10/06* (2013.01); *F16H 61/00* (2013.01); *F02D 17/00* (2013.01); *F02D 29/00* (2013.01); *F02D 29/02* (2013.01); *F16H 63/50* (2013.01); *F16H 61/66272* (2013.01); *B60W 10/11* (2013.01); *F16H 61/662* (2013.01); *F16H 2312/14* (2013.01); *F16N 11/08* (2013.01); *F16H 2037/023* (2013.01); *F16H 2059/465* (2013.01); *F01M 2001/123* (2013.01)
USPC ............................................ 701/54; 477/110

(58) Field of Classification Search
USPC ................... 701/54, 58, 60, 70; 477/107, 110
See application file for complete search history.

(56) References Cited

U.S. PATENT DOCUMENTS

| 8,246,517 B2 | 8/2012 | Senda et al. |
|---|---|---|
| 2010/0184562 A1 | 7/2010 | Senda et al. |

(Continued)

FOREIGN PATENT DOCUMENTS

| JP | 2009-275712 A | 11/2009 |
|---|---|---|
| JP | 2010-164143 A | 7/2010 |
| JP | 2011-001913 A | 1/2011 |
| JP | 2011-007236 A | 1/2011 |

*Primary Examiner* — Justin Holmes
(74) *Attorney, Agent, or Firm* — Foley & Lardner LP

(57) ABSTRACT

A coast stop vehicle includes power transmission means provided between a drive source and drive wheels, drive source automatic stop means configured to stop the drive source during vehicle running when a value indicating a driving state of the vehicle is in a drive source stop permission region, slip determination means configured to determine whether or not there is slip in the power transmission means while the drive source is stopped by the drive source automatic stop means, and a changer means configured to narrow the drive source stop permission region when the occurrence of the slip in the power transmission means was determined by the slip determination means.

10 Claims, 12 Drawing Sheets

(51) Int. Cl.
  *F02D 29/00* (2006.01)
  *F02D 29/02* (2006.01)
  *F16H 63/50* (2006.01)
  *F16H 61/662* (2006.01)
  *B60W 10/11* (2012.01)
  *F16N 11/08* (2006.01)
  *F16H 37/02* (2006.01)
  *F16H 59/46* (2006.01)
  *F01M 1/12* (2006.01)

(56) References Cited

U.S. PATENT DOCUMENTS

| 2012/0298462 A1* | 11/2012 | Wakayama et al. | 192/48.601 |
| 2014/0106933 A1* | 4/2014 | Tatewaki et al. | 477/92 |
| 2014/0207347 A1* | 7/2014 | Waku et al. | 701/54 |
| 2014/0221154 A1* | 8/2014 | Tatewaki | 477/45 |

* cited by examiner

COAST STOP VEHICLE

TECHNICAL FIELD

The present invention relates to a coast stop vehicle.

BACKGROUND ART

Conventionally, it is disclosed in JP2010-164143A to automatically stop fuel injection into an engine and zero the rotation speed of the engine (hereinafter, referred to as "coast stop") when a predetermined deceleration state is reached during vehicle running and a predetermined condition is satisfied.

SUMMARY OF INVENTION

Since an engine is stopped while a coast stop control is executed, an oil pump to which a part of the rotation of the engine is transmitted and which discharges oil is also stopped. Thus, a slip may occur in a power transmission unit such as a clutch, for example, due to a reduction in a hydraulic pressure of the power transmission unit.

If a re-acceleration request is made by a driver and the predetermined condition is no longer satisfied while the coast stop control is executed, the coast stop control is finished and the engine is restarted. At this time, if there is a slip in the power transmission unit, a shock occurs due to re-engagement of the power transmission unit. Thus, the power transmission unit is preferably engaged while the coast stop control is executed.

Further, by setting a maximally wide coast stop execution region under each predetermined condition, the coast stop control is executed in a relatively early stage after a coast state is reached, whereby fuel economy can be improved.

However, if the coast stop execution region is set to be too wide, a hydraulic pressure lower than a set hydraulic pressure is supplied to the power transmission unit and the hydraulic pressure supplied to the power transmission unit becomes insufficient due to variations of components and variations of sensor detection values. Thus, a slip may occur in the power transmission unit while the coast stop control is executed.

It is also possible to set a narrow coast stop execution region so that no slip occurs in the power transmission unit, but fuel economy cannot be improved in this case.

The present invention was developed to solve such problems and aims to improve fuel economy and suppress the occurrence of a slip in a power transmission unit by maximally widening a coast stop execution region.

A coast stop vehicle according to a certain aspect of the present invention includes power transmission means provided between a drive source and drive wheels, drive source automatic stop means configured to stop the drive source during vehicle running when a value indicating a driving state of the vehicle is in a drive source stop permission region, slip determination means configured to determine whether or not there is a slip in the power transmission means while the drive source is stopped by the drive source automatic stop means, and a changer means configured to narrow the drive source stop permission region when the occurrence of the slip in the power transmission means was determined by the slip determination means.

According to this aspect, if a slip occurs in the power transmission means while the drive source is stopped during vehicle running, a drive source automatic stop condition is changed to suppress the stop of the drive source more than in the currently set drive source stop permission region. Thus, fuel economy an be improved and a slip in the power transmission means can be suppressed.

DESCRIPTION OF EMBODIMENTS

Hereinafter, embodiments of the present invention are described with reference to the accompanying drawings. It should be noted that, in the following description, a "speed ratio" of a certain transmission mechanism is a value obtained by dividing an input rotation speed of this transmission mechanism by an output rotation speed thereof. Further, a "lowest speed ratio" is a maximum speed ratio of this transmission mechanism used such as at the time of starting a vehicle. A "highest speed ratio" is a minimum speed ratio of this transmission mechanism.

Figure 1:
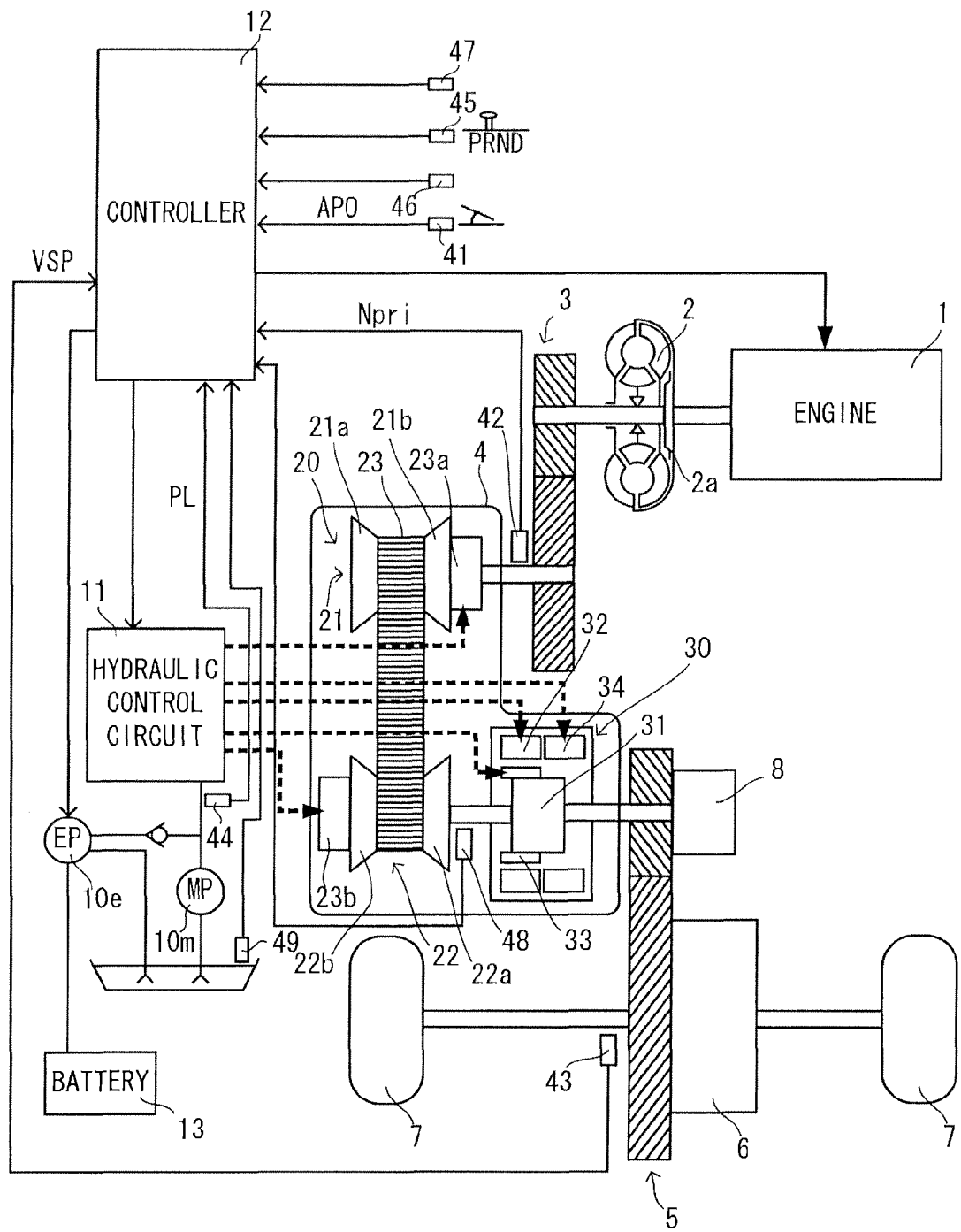
FIG. 1 is a schematic configuration diagram of a coast stop vehicle according to a first embodiment.

FIG. 1 is a schematic configuration diagram of a coast stop vehicle according to the embodiments of the present invention. This vehicle includes an engine 1 as a drive source, and output rotation of the engine 1 is transmitted to drive wheels 7 via a torque converter 2 with a lock-up clutch 2a, a first gear train 3, a continuously variable transmission (hereinafter, merely referred to as a "transmission 4"), a second gear train 5 and a final speed reducer 6. The second gear train 5 includes a parking mechanism 8 for mechanically and unrotatably locking an output shaft of the transmission 4 in a parked state.

The transmission 4 includes a mechanical oil pump 10m to which the rotation of the engine 1 is input and which is driven by utilizing a part of power of the engine 1 and an electrical oil pump 10e which is driven upon receiving the supply of power from a battery 13. The electrical oil pump 10e is composed of an oil pump main body and an electric motor and motor driver for driving and rotating this oil pump main body, and can control an operating load to an arbitrary load or in multiple steps. Further, the transmission 4 includes a hydraulic control circuit 11 for adjusting a hydraulic pressure (hereinafter, referred to as a "line pressure PL") from the mechanical oil pump 10m or the electrical oil pump 10e and supplying the adjusted hydraulic pressure to each component of the transmission 4.

The transmission 4 includes a belt type continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected before (at input shaft side of) the variator 20.

The variator 20 includes a primary pulley 21, a secondary pulley 22 and a V-belt 23 mounted between the pulleys 21 and 22. Each of the pulleys 21, 22 includes a fixed conical plate 21a, 22a, a movable conical plate 21b, 22b arranged with a sheave surface faced toward the fixed conical plate 21a, 22a and forming a V-groove between the fixed conical plate 21a, 22a and the movable conical plate 21b, 22b, and a hydraulic cylinder 23a, 23b provided on the back surface of this movable conical plate 21b, 22b for displacing the movable conical plate 21b, 22b in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes.

A pressure receiving area of the hydraulic cylinder 23a of the primary pulley 21 is preferably large so as to have a large torque capacity even if the hydraulic pressure supplied to the hydraulic cylinder 23a of the primary pulley 21 is low. The primary pulley 21 and the secondary pulley 22 are so provided that the pressure receiving area of the primary pulley 21 is larger than that of the secondary pulley 22.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, reverse brake 34) which are connected to a plurality of rotation elements constituting the Ravigneaux-type planetary gear mechanism 31 to change coupled states of these rotation elements. If a supply hydraulic pressure to each frictional engagement element 32 to 34 is adjusted to change engaged and released states of each frictional engagement element 32 to 34, a gear position of the sub-transmission mechanism 30 is changed.

For example, the sub-transmission mechanism 30 is set to a first gear position if the low brake 32 is engaged and the high clutch 33 and the reverse brake 34 are released. The sub-transmission mechanism 30 is set to a second gear position with a gear ratio smaller than in the first gear position if the high clutch 33 is engaged and the low brake 32 and the reverse brake 34 are released. Further, the sub-transmission mechanism 30 is set to a reverse gear position if the reverse brake 34 is engaged and the low brake 32 and the high clutch 33 are released.

Each of the frictional engagement elements 32 to 34 is provided before or after the variator 20 on the power transmission path. Power transmission of the transmission 4 is enabled if any one of the frictional engagement elements 32 to 34 is engaged while being disabled if all the frictional engagement elements 32 to 34 are released.

The hydraulic control circuit 11 is composed of a plurality of flow passages and a plurality of hydraulic control valves. In accordance with a transmission control signal from a controller 12, the hydraulic control circuit 11 controls the plurality of hydraulic control valves to switch supply paths of the hydraulic pressure, prepares a necessary hydraulic pressure from a hydraulic pressure produced by the mechanical oil pump 10m or the electrical oil pump 10e, and supplies this hydraulic pressure to each component of the transmission 4. In this way, the speed ratio of the variator 20 and the gear position of the sub-transmission mechanism 30 are changed to shift the transmission 4.

Figure 2:
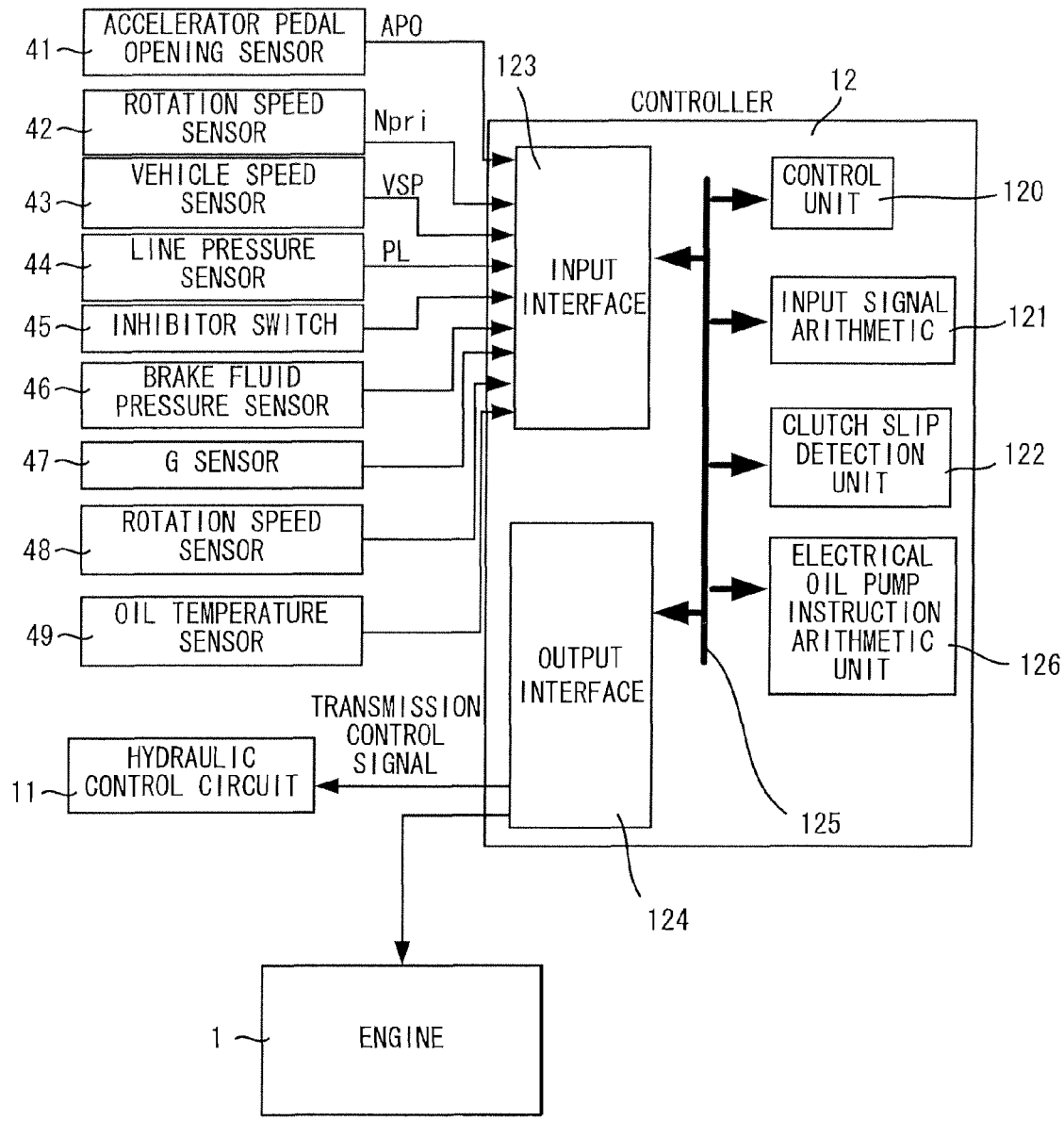
FIG. 2 is a schematic configuration diagram of a controller of the first embodiment.

The controller 12 is a controller for controlling the engine 1 and the transmission 4 in a comprehensive manner and composed of an input interface 123, an output interface 124, an input signal arithmetic unit 121, a clutch slip detection unit 122, an electrical oil pump instruction arithmetic unit 126, a control unit 120, and a bus 125 which connects these components to each other as shown in FIG. 2. The controller 12 is composed of a CPU, a ROM, a RAM and the like, and functions of the controller 12 are fulfilled by the CPU reading a program stored in the ROM.

To the input interface 123 are input an output signal of an accelerator pedal opening sensor 41 for detecting an accelerator pedal opening APO which is an operated amount of an accelerator pedal, an output signal of a rotation speed sensor 42 for detecting an input rotation speed of the transmission 4, an output signal of a rotation speed sensor 48 for detecting an output rotation speed of the transmission 4, an output signal of a vehicle speed sensor 43 for detecting a vehicle speed VSP, an output signal of a line pressure sensor 44 for detecting a line pressure PL, an output signal of an inhibitor switch 45 for detecting the position of a select lever, an output signal of a brake fluid pressure sensor 46 for detecting a brake fluid pressure, an output signal of a G-sensor 47 for detecting an acceleration or deceleration of the vehicle, an output signal of an oil temperature sensor 49 and like output signals.

The input signal arithmetic unit 121 calculates a rotation speed of the sub-transmission mechanism 30 on the side of the drive wheels 7 (hereinafter, referred to as a "first rotation speed") from the output signal of the vehicle speed sensor 43 and calculates a rotation speed of the sub-transmission mechanism 30 on the engine side (hereinafter, referred to as a "second rotation speed") from the output signal of the rotation speed sensor 48.

The control unit 120 is connected to the input interface 123, the input signal arithmetic unit 121 and the like and controls the vehicle including these. The control unit 120 applies various arithmetic processings to various signals input via the input interface 123 to generate a transmission control signal and the like, and outputs the generated signals to the hydraulic control circuit 11 and the engine 1 via the output interface 124.

The control unit 120 executes a coast stop control described below to suppress a fuel consumption amount and improve fuel economy.

The coast stop control is a control for suppressing the fuel consumption amount by automatically stopping the engine 1 while the vehicle is running in a low speed range. The coast stop control is common to a fuel-cut control performed when an accelerator is off in that fuel supply to the engine 1 is stopped, but differs therefrom in that the power transmission path between the engine 1 and the drive wheels 7 is cut off to completely stop the rotation of the engine 1 by releasing the lock-up clutch.

In executing the coast stop control, the control unit 120 first judges, for example, coast stop conditions a to f listed below. These conditions are, in other words, conditions for judging whether or not a driver has an intention to stop the vehicle.

a: Accelerator pedal is not depressed at all (accelerator pedal opening APO=0).

b: Brake pedal is depressed (brake fluid pressure is not lower than a predetermined value).

c: Vehicle speed is a predetermined coast stop starting vehicle speed or lower.

d: Lock-up clutch 2a is released.

e: Oil temperature is in a predetermined oil temperature range.

f: Speed ratio of the variator 20 is in a predetermined speed ratio region.

When all of these coast stop conditions are satisfied, the control unit 120 executes the coast stop control.

The predetermined speed ratio region of the coast stop condition f is a region between a first predetermined speed ratio and a second predetermined speed ratio larger (lower side) than the first predetermined speed ratio. The second predetermined speed ratio is, for example, lowest. The first predetermined speed ratio is set so as not to impair vehicle drivability when the coast stop control is finished or canceled and the vehicle is accelerated again thereafter. If the speed ratio can be set to be, for example, lowest during the coast stop control, the first predetermined speed ratio may be highest.

When the coast stop control is executed, a hydraulic pressure necessary for the high clutch 33, the variator 20 and the like is generated by the electrical oil pump 10e since the rotation of the engine 1 is completely stopped. A discharge pressure of the electrical oil pump 10e is calculated by the electrical oil pump instruction arithmetic unit 126 and a drive signal for the electrical oil pump 10e is output based on the calculated discharge pressure. The electrical oil pump 10e is controlled based on the drive signal.

If the coast stop control is started in an early stage, an automatic stop time of the engine 1 becomes longer and fuel economy can be improved. For example, if the coast stop starting vehicle speed is high, a coast stop execution region (drive source stop permission region) relating to the vehicle speed is wide. Even if the other coast stop conditions are the same, the coast stop control is started in a relatively early stage, the automatic stop time of the engine 1 becomes longer and fuel economy can be improved.

However, even if the electrical oil pump 10e discharges oil based on the drive signal, an actual discharge pressure may be lower than a set discharge pressure due to a variation in a dischargeable pressure of the electrical oil pump 10e. If the coast stop execution region is widened, a hydraulic pressure shortage may occur during the coast stop control and a slip may occur in the high clutch 33 in the coast stop vehicle including the electrical oil pump 10e with a low dischargeable pressure. Conventionally, a coast stop execution region of each coast stop condition is set within such a range as not to cause a slip in the high clutch 33. That is, the coast stop conditions are so set as not to cause a slip in the high clutch 33 despite a variation in the dischargeable pressure of the electrical oil pump 10e or the like.

In the present embodiment, the coast stop execution region is set to be wider than the conventional coast stop execution region to improve fuel economy. Specifically, fuel economy is improved by setting an initial value of the coast stop starting vehicle speed to be higher than a conventional coast stop starting vehicle speed.

Then, a state of the high clutch 33 is detected by the clutch slip detection unit 122. If a slip occurs in the high clutch 33, the control unit 122 sets a lower coast stop starting vehicle speed in the next and subsequent coast stop controls to narrow the coast stop execution region relating to the vehicle speed, thereby suppressing the occurrence of a slip in the high clutch 33.

Figure 3:
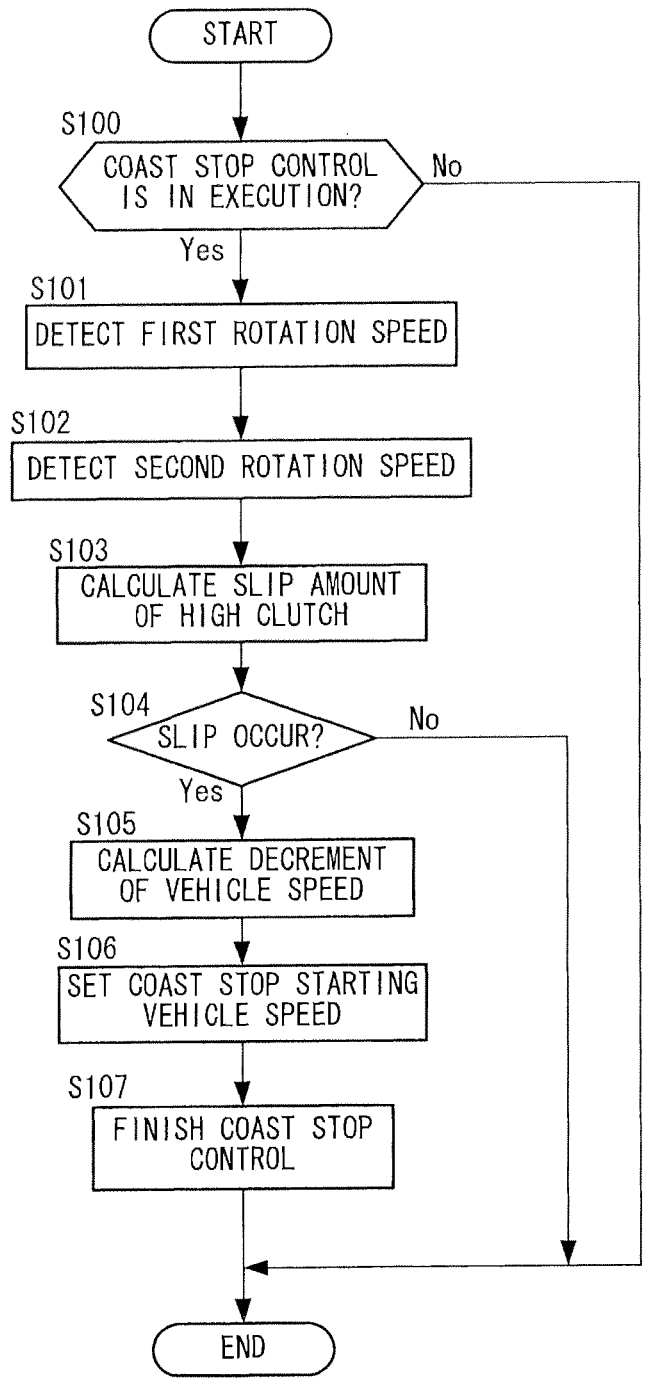
FIG. 3 is a flow chart showing a coast stop control of the first embodiment.

Next, the coast stop control of the present embodiment is described using a flow chart of FIG. 3.

In Step S100, the control unit 120 determines whether or not the coast stop control is in execution. The control unit 120 proceeds to Step S101 if the coast stop control is in execution while finishing this control unless the coast stop control is in execution.

In Step S101, the control unit 120 detects the first rotation speed based on a signal from the vehicle speed sensor 43.

In Step S102, the control unit 120 detects the second rotation speed based on a signal from the rotation speed sensor 48.

In Step S103, the clutch slip detection unit 122 calculates a slip amount of the high clutch 33. Specifically, the clutch slip detection unit 122 calculates a rotation speed difference in the high clutch 33 based on the first rotation speed detected in Step S101, the second rotation speed detected in Step S102 and speed ratios in the second gear train 5 and the high clutch 33.

In Step S104, the clutch slip detection unit 122 determines whether or not there is a slip in the high clutch 33 based on the slip amount of the high clutch 33 calculated in Step S103. Specifically, the clutch slip detection unit 122 determines the occurrence of a slip in the high clutch 33 if a current rotation speed difference in the high clutch 33 is larger than a rotation speed difference in the high clutch 33 when the slip amount of the high clutch 33 is zero, i.e. there is no slip. The clutch slip detection unit 122 proceeds to Step S105 if there is a slip in the high clutch 33 while finishing this control if there is no slip in the high clutch 33.

Figure 4:
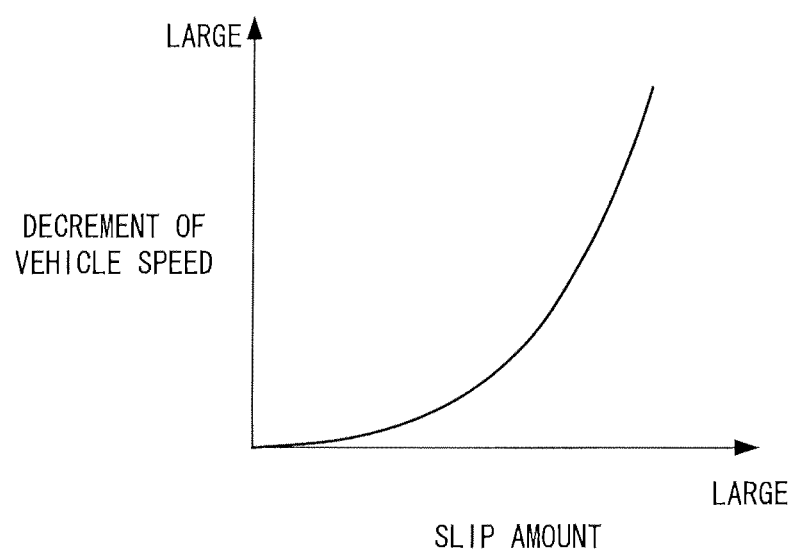
FIG. 4 is a map showing a relationship between slip amount and decrement of a coast stop starting vehicle speed.

In Step S105, the control unit 120 calculates a decrement of the coast stop starting vehicle speed using a map shown in FIG. 4 based on the slip amount of the high clutch 33.

Figure 5:
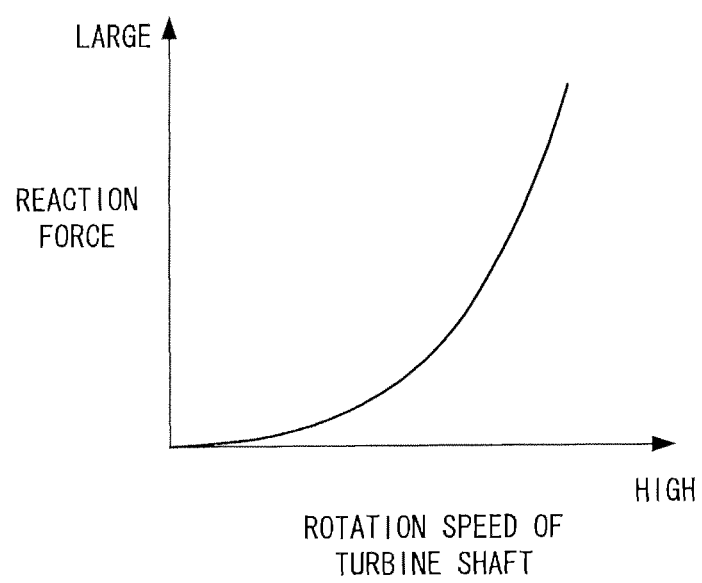
FIG. 5 is a map showing a relationship between rotation speed of a turbine shaft and reaction force received by the turbine shaft.

During the coast stop control, the lock-up clutch 2a is released, the torque converter 2 is in a converter state and the engine 1 is stopped. Although the rotation of the drive wheels 7 is transmitted to a turbine shaft of the torque converter 2, the turbine shaft receives a reaction force since the engine 1 is stopped. The reaction force received by the turbine shaft increases with an increase in the rotation speed (vehicle speed) of the turbine shaft as shown in FIG. 5. FIG. 5 is a map showing a relationship between the rotation speed of the turbine shaft and the reaction force received by the turbine shaft. As the reaction force received by the turbine shaft increases, a hydraulic pressure necessary to engage the high clutch 33 so that a slip does not occur in the high clutch 33 increases. During the coast stop control, the hydraulic pressure necessary to engage the high clutch 33 is generated by the electrical oil pump 10e and the discharge pressure of the electrical oil pump 10e needs to be increased as the rotation speed of the turbine shaft increases.

However, if the dischargeable pressure of the electrical oil pump 10e is low due to variations of components or the like, the hydraulic pressure necessary to prevent the occurrence of a slip in the high clutch 33 may not be supplied from the electrical oil pump 10 to the high clutch 33.

Accordingly, the control unit 120 calculates the decrement of the coast stop starting vehicle speed based on the slip amount of the high clutch 33 if the slip occurs in the high clutch 33.

In Step S106, the control unit 120 sets a vehicle speed obtained by subtracting the decrement of the coast stop starting vehicle speed calculated in Step S105 from the currently set coast stop starting vehicle speed as a new coast stop starting vehicle speed.

In this way, the next and subsequent coast stop controls are executed when the vehicle speed is equal to or lower than the newly set coast stop starting vehicle speed and the other coast stop conditions are satisfied. That is, the coast stop execution region relating to the vehicle speed becomes narrower from the next time on. Thus, the coast stop control is not executed and the engine 1 is driven at the vehicle speed at which the slip occurred in the high clutch 33 this time. Since the hydraulic pressure is generated by the mechanical oil pump 10m due to the drive of the engine 1 and the high clutch 33 is engaged by this hydraulic pressure, the occurrence of a slip in the high clutch 33 is suppressed.

In Step S107, the control unit 120 finishes the coast stop control.

As described above, by reducing the coast stop starting vehicle speed if a slip occurs in the high clutch 33 during the coast stop control, the rotation speed of the turbine shaft is reduced in the next and subsequent coast stop controls and a slip of the high clutch 33 can be suppressed.

It should be noted that the control unit 120 stores the newly set coast stop starting vehicle speed until an ignition switch is turned off. This can prevent the coast stop control from being executed at the vehicle speed at which the slip occurred in the high clutch 33 and suppress the occurrence of a slip in the high clutch 33.

Further, the control unit 120 does not set a new coast stop starting vehicle speed even if a slip is detected in the high clutch 33 during the coast stop control when a deceleration of the vehicle is higher than a predetermined deceleration indicating sudden deceleration. If a new coast stop starting vehicle speed is set to prevent the occurrence of a slip when the vehicle is suddenly decelerated, the coast stop execution region is minimized and fuel economy cannot be improved. Thus, the new coast stop starting vehicle speed is not set if the deceleration of the vehicle is higher than the predetermined deceleration indicating sudden deceleration. As a result, fuel economy can be improved without unnecessarily narrowing the coast stop execution region relating to the vehicle speed.

Figure 6:
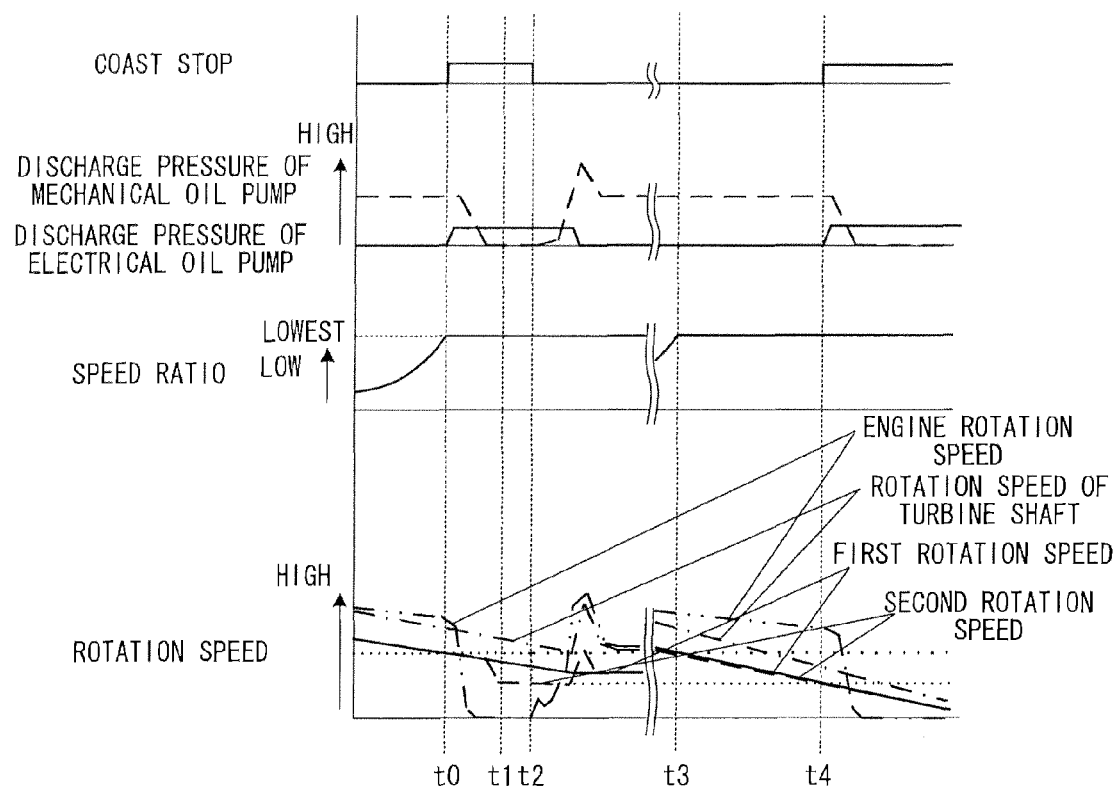
FIG. 6 is a time chart when the coast stop control of the first embodiment is executed.

Next, a time chart in the case of executing the coast stop control is described using FIG. 6. In FIG. 6, an engine rotation speed is shown in chain double-clashed line, the rotation speed of the turbine shaft in dashed-dotted line, the first rotation speed in solid line, the second rotation speed in broken like and the coast stop starting vehicle speed in dotted line. Further, a discharge pressure of the mechanical oil pump 10m is shown in broken line.

At time t0, the coast stop control is started. By this, the engine 1 is stopped and the discharge pressure of the mechanical oil pump 10m decreases. Further, the electrical oil pump 10e is driven and the discharge pressure of the electrical oil pump 10e increases. The first and second rotation speeds gradually decrease.

If the rotation speed of the turbine shaft is relatively high, the reaction force received by the turbine shaft in the torque converter 2 is large. Thus, a slip occurs in the high clutch 33 at time t1 when the discharge pressure is low due to a variation in the dischargeable pressure of the electrical oil pump 10e.

If the slip occurs in the high clutch 33, the coast stop starting vehicle speed is reduced based on the slip amount of the high clutch 33 and the coast stop control is finished at time t2. The coast stop starting vehicle speed before a change is shown in narrowly spaced dotted line for description after time t1.

Thereafter, even if a driving state of the vehicle becomes a coast state again and the vehicle speed reaches the coast stop starting vehicle speed at which the coast stop control was started at time t1 at time t3, the coast stop control is not started.

When the vehicle speed reaches the changed coast stop starting vehicle speed at time t4, the coast stop control is started. Here, the reaction force received by the turbine shaft is small since the vehicle speed is sufficiently low. Thus, even if the dischargeable pressure of the electrical oil pump 10e is low, the high clutch 33 can be engaged without slipping due to the hydraulic pressure discharged from the electrical oil pump 10e.

Effects of the first embodiment of the present invention are described.

If the coast stop execution region is set to be wider than the conventional coast stop execution region and a slip occurs in the high clutch 33 during the coast stop control, the coast stop execution region is made narrower than the current coast stop execution region. By this, the coast stop control can be executed also in the coast stop execution region where the coast stop control is not conventionally executed, and fuel economy can be improved.

If a re-acceleration request is made by the driver when there is a slip in the high clutch 33 during the coast stop control, the coast stop control is canceled and the engine 1 is restarted. Since a high hydraulic pressure is supplied from the mechanical oil pump 10m if the engine 1 is restarted, the high clutch 33 is completely engaged. At this time, an engagement shock corresponding to the slip amount occurs and increases as the slip amount increases.

In the present embodiment, if a slip occurs in the high clutch 33 during the coast stop control, the re-occurrence of a slip in that region (under that condition) can be suppressed. Thus, it is possible to prevent the execution of the coast stop control under such a condition that a slip occurs in the high clutch 33 and suppress the occurrence of a shock at the time of re-engagement when a re-acceleration request is made by the driver during the coast stop control and the engine 1 is restarted. Further, the degradation of the high clutch 33 due to the slip can be suppressed.

If a slip occurs in the high clutch 33 during the coast stop control, the coast stop starting vehicle speed is reduced. This can prevent the start of the coast stop control at the vehicle speed at which the slip occurred in the high clutch 33 and suppress the occurrence of a slip in the high clutch 33.

If a slip occurs in the high clutch 33 after the coast stop starting vehicle speed is changed, the changed coast stop starting vehicle speed is further changed based on the slip amount of the high clutch 33. This can suppress the occurrence of a slip in the high clutch 33 while improving fuel economy by gradually reducing the coast stop starting vehicle speed and setting the coast stop starting vehicle speed to be as high as possible.

The decrement of the coast stop starting vehicle speed increases with an increase in the slip amount of the high clutch 33. A shortage of the hydraulic pressure supplied from the electrical oil pump 10e to the high clutch 33 increases with an increase in the slip amount of the high clutch 33. Thus, the occurrence of a slip in the high clutch 33 from the next time on can be suppressed by increasing the decrement of the coast stop starting vehicle speed with an increase in the slip amount of the high clutch 33.

Even if a slip is detected in the high clutch 33 when the discharge pressure of the electrical oil pump 10e becomes higher than that of the mechanical oil pump 10m and the vehicle is being suddenly decelerated, the coast stop starting vehicle speed is not changed. In such a case, the coast stop starting vehicle speed is not changed since a shock caused by engagement hardly occurs even if a slip occurs in the high clutch 33 and, thereafter, the hydraulic pressure is supplied to engage the high clutch 33. Fuel economy can be improved by not changing the coast stop starting vehicle speed if a slip in the high clutch 33 is not problematic.

The changed coast stop starting vehicle speed is stored until the ignition switch is turned off. This can prevent the coast stop control from being executed at the vehicle speed at which a slip occurred in the high clutch 33 and suppress the occurrence of a slip in the high clutch 33.

Further, the coast stop starting vehicle speed is reset to the initial value when the ignition switch is turned off. Contrary to this, it is considered to continue to use the changed coast stop starting vehicle speed also after the ignition switch is turned on next time without resetting the coast stop starting vehicle speed to the initial value even if the ignition switch is turned off. In this case, changes are repeatedly made for the narrowed coast stop execution region relating to the vehicle speed and the coast stop execution region continues to become gradually narrower. The driving state of the vehicle changes due to a change in the operation of the driver, a change in a road surface condition, a change in surrounding environments and the like. Thus, a slip does not necessarily occur every time even at the vehicle speed at which a slip occurred last time. Therefore, it is possible to execute the coast stop control in a wide range and improve fuel economy by resetting the coast stop starting vehicle speed to the initial value and widening the coast stop execution region again.

Such initialization of the coast stop starting vehicle speed can be made also when a running distance of the vehicle reaches a predetermined running distance. However, if the predetermined running distance is set to be long, a time during which the coast stop control is executed becomes shorter and a fuel economy improvement effect is reduced. On the other hand, if the predetermined running distance is set to be short, the coast stop starting vehicle speed is initialized for a time until the ignition switch is turned off after being turned on, thereby bothering the driver. The same applies also when the coast stop starting vehicle speed is initialized according to a running time. Thus, the coast stop starting vehicle speed is preferably initialized when the ignition switch is turned off to finish driving.

Next, a second embodiment of the present invention is described.

The description of the second embodiment is centered on parts different from the first embodiment.

Figure 7:
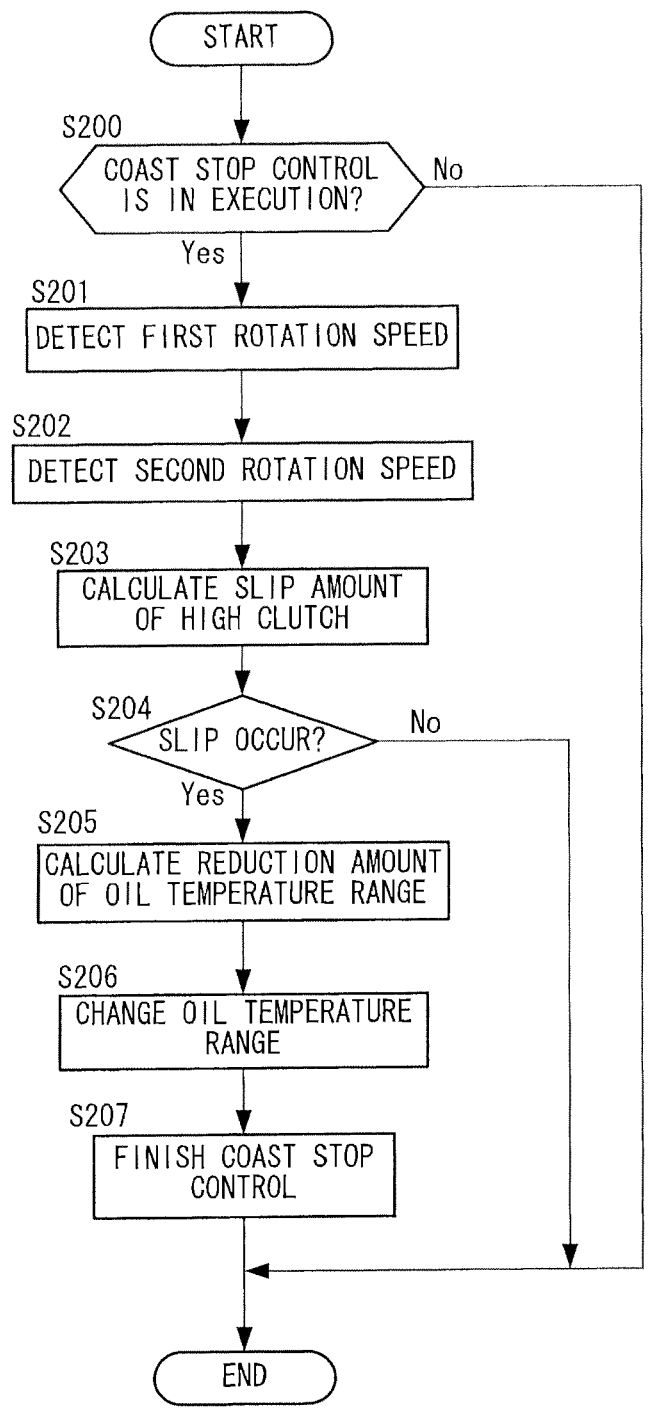
FIG. 7 is a flow chart showing a coast stop control of a second embodiment.

A coast stop control of the present embodiment is described using a flow chart of FIG. 7.

The control from Step S200 to Step S204 is not described since being the same as that from Step S100 to Step S104 of the first embodiment.

Figure 8:
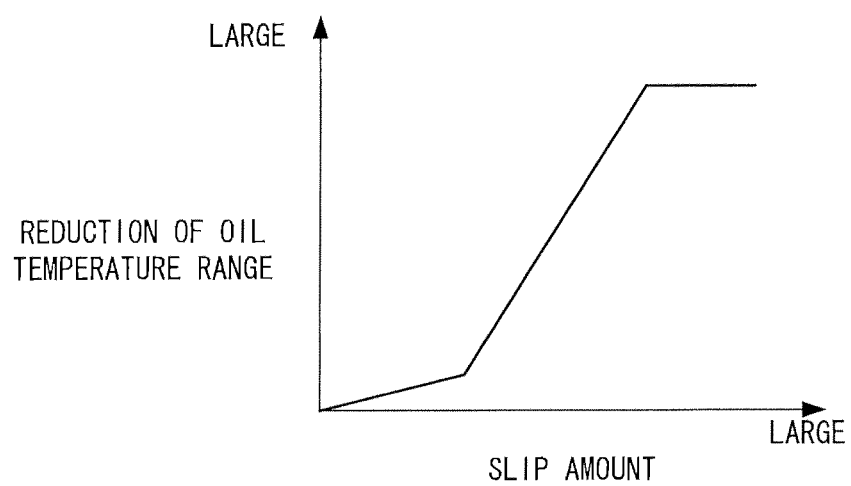
FIG. 8 is a map showing a relationship between slip amount and reduction amount of an oil temperature range.
Figure 9:
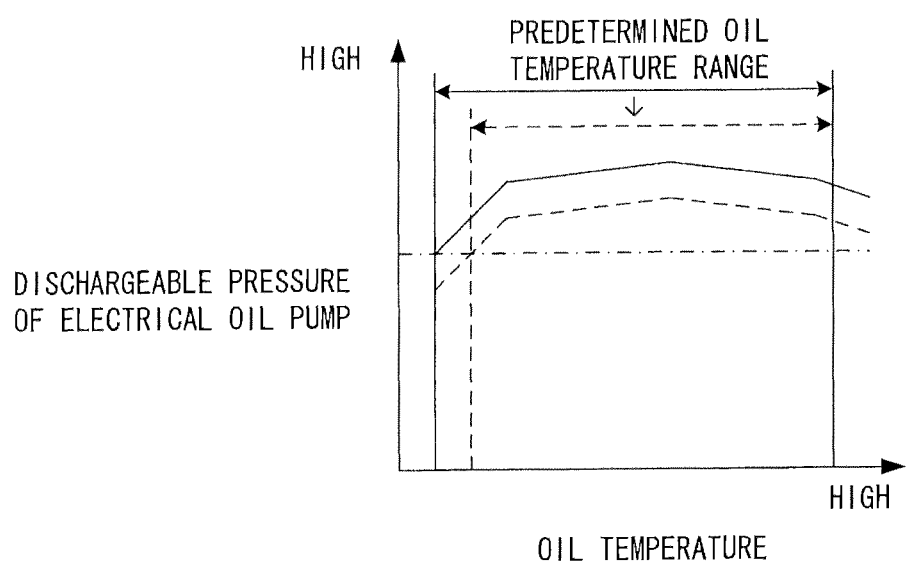
FIG. 9 is a map showing a relationship between oil temperature and dischargeable pressure of an electrical oil pump.

In Step S205, a control unit 120 calculates a reduction amount of a predetermined oil temperature range of a coast stop condition based on a slip amount of a high clutch 33 from a map shown in FIG. 8. FIG. 8 is the map showing a relationship between the slip amount of the high clutch 33 and the reduction amount of the predetermined oil temperature range. The reduction amount of the predetermined oil temperature range increases with an increase in the slip amount. That is, as the slip amount increases, a coast stop execution region relating to oil temperature becomes narrower and the predetermined oil temperature range becomes narrower. A dischargeable pressure of an electrical oil pump 10e may be lower than a set dischargeable pressure due to variations of components or the like. A relationship between such a dischargeable pressure of the electrical oil pump 10e and oil temperature is shown in FIG. 9. In FIG. 9, the set dischargeable pressure is shown in solid line and the dischargeable pressure of the electrical oil pump 10e lower than the set dischargeable pressure is shown in broken line. Further, a discharge pressure of the electrical oil pump 10e which does not cause a slip in the high clutch 33 during the coast stop control is shown in dashed-dotted line. According to FIG. 9, in the electrical oil pump 10e whose actual discharge pressure is lower than the set dischargeable pressure, the discharge pressure may become lower than the discharge pressure at which no slip occurs in the high clutch 33 during the coast stop control. Thus, a hydraulic pressure necessary not to cause a slip in the high clutch 33 may not be able to be supplied by the electrical oil pump 10e.

Accordingly, the control unit 120 calculates the reduction amount of the oil temperature range based on the slip amount of the high clutch 33 when a slip occurs in the high clutch 33.

In Step S206, the control unit 120 narrows the predetermined oil temperature range of the coast stop condition based on the calculated reduction amount of the oil temperature range. In the present embodiment, the predetermined oil temperature range is narrowed by adding the reduction amount to a lower limit value of the currently set predetermined oil temperature range. In FIG. 9, the predetermined oil temperature range is changed from a range shown by solid-line arrows to the one shown by broken-line arrows.

In Step S207, the control unit 120 finishes the coast stop control.

It should be noted that the control unit 120 stores the newly set predetermined oil temperature range until an ignition switch is turned off. This can prevent the coast stop control from being executed at the oil temperature at which the slip occurred in the high clutch 33 and suppress the occurrence of a slip in the high clutch 33.

Figure 10:
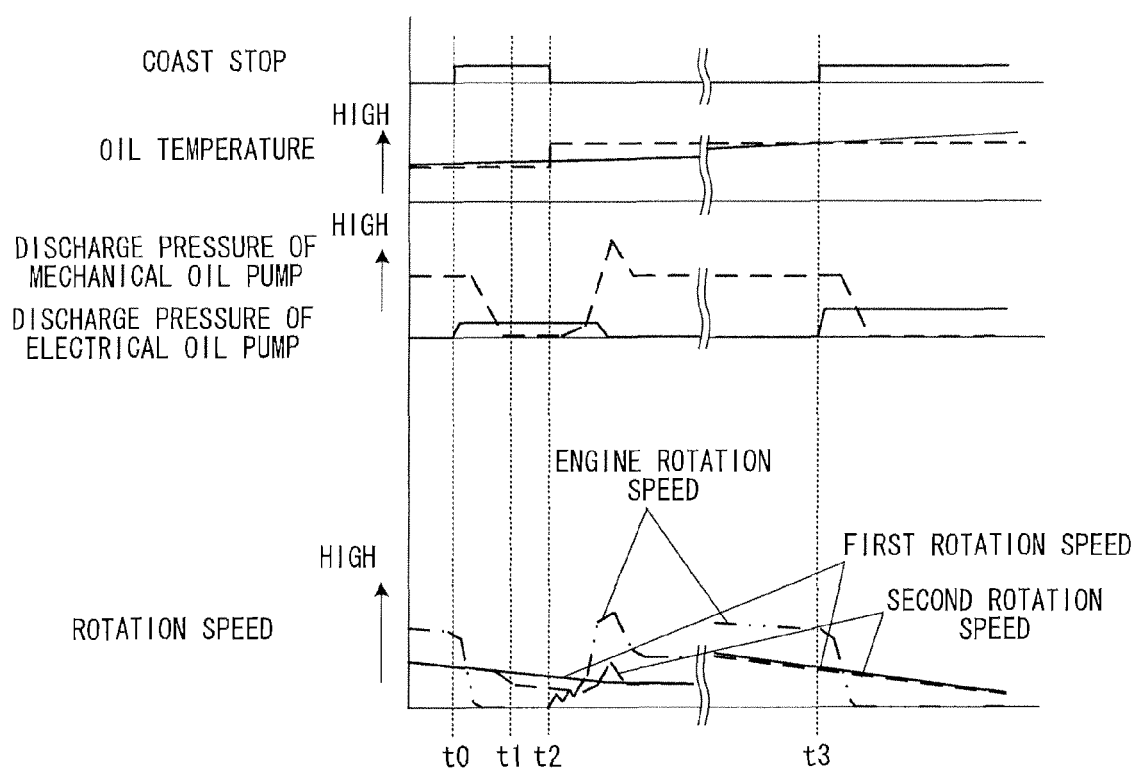
FIG. 10 is a time chart when the coast stop control of the second embodiment is executed.

Next, a time chart in the case of executing the coast stop control of the present embodiment is described using FIG. 10. In FIG. 10, an engine rotation speed is shown in chain double-dashed line, a first rotation speed in solid line and a second rotation speed in broken like. Further, a discharge pressure of the mechanical oil pump 10m is shown in broken line. Furthermore, the lower limit value of the predetermined oil temperature range is shown in broken line.

At time t0, the coast stop control is started. By this, the engine 1 is stopped and the discharge pressure of the mechanical oil pump 10m decreases. Further, the electrical oil pump 10e is driven and the discharge pressure of the electrical oil pump 10e increases. The first and second rotation speeds gradually decrease.

If the dischargeable pressure of the electrical oil pump 10e varies and is low and the actual discharge pressure of the electrical oil pump 10e is lower than the set discharge pressure, a slip occurs in the high clutch 33 at t1.

If the slip occurs in the high clutch 33, the predetermined oil temperature range is narrowed by changing the lower limit value of the predetermined oil temperature range and the coast stop control is finished at time t2.

Thereafter, even if a driving state of a vehicle reaches a coast state and the oil temperature is higher than the lower limit value of the predetermined oil temperature range before the change, the coast stop control is not executed.

When the oil temperature reaches the lower limit value of the changed predetermined oil temperature range at time t3, the coast stop control is started. Since the oil temperature is high, the discharge pressure of the electrical oil pump 10e is high and the occurrence of a slip in the high clutch 33 can be suppressed.

Effects of the second embodiment of the present invention are described.

If a slip occurs in the high clutch 33 during the coast stop control, the predetermined oil temperature range is narrowed. This can prevent the execution of the coast stop control at an oil temperature at which the slip occurred and suppress the occurrence of a slip in the high clutch 33.

Next, a third embodiment of the present invention is described.

Figure 11:
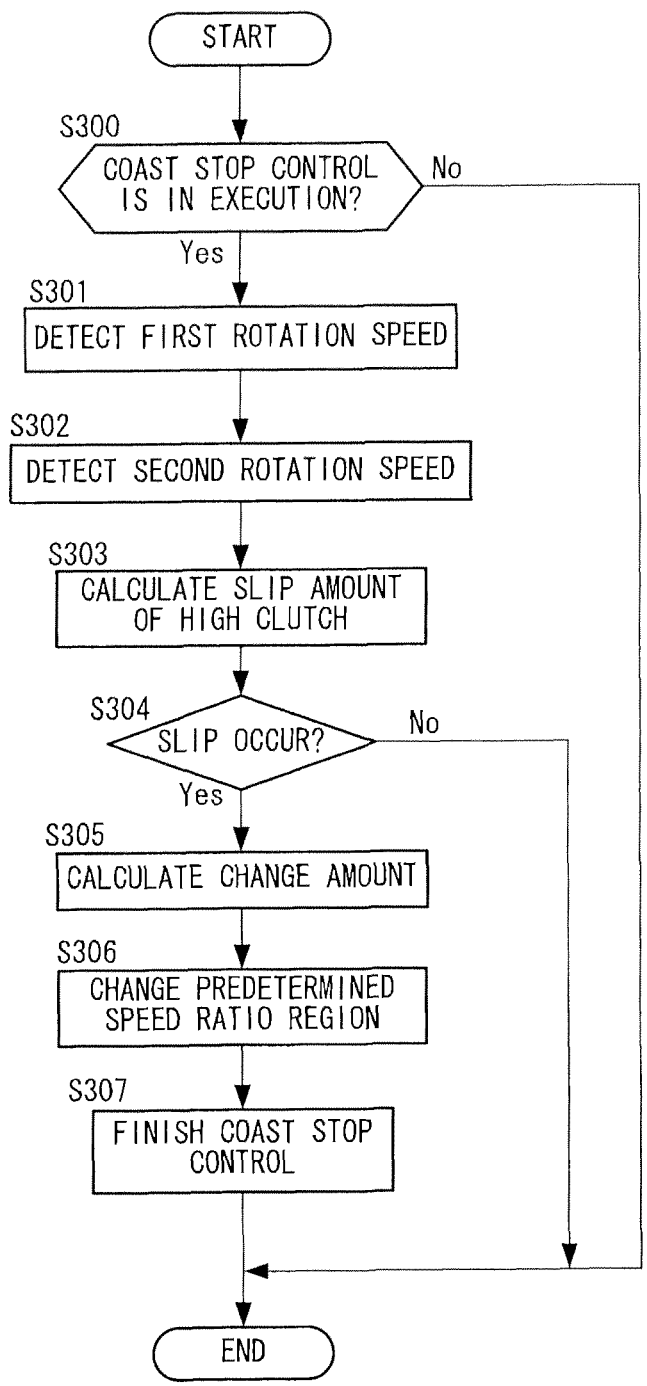
FIG. 11 is a flow chart showing a coast stop control of a third embodiment.

A coast stop control of the present embodiment is described using a flow chart of FIG. 11.

The control from Step S300 to Step S304 is not described since being the same as that from Step S100 to Step S104 of the first embodiment.

Figure 12:
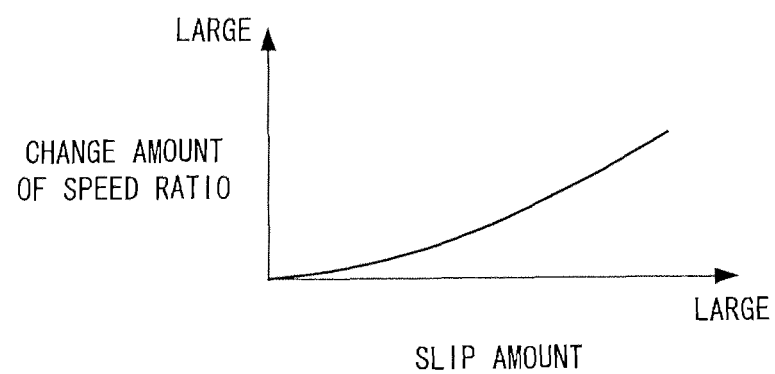
FIG. 12 is a map showing a relationship between slip amount and speed ratio change amount.

In Step S305, a control unit 120 calculates a change amount of a speed ratio of a variator 20 at the time of starting the coast stop control using a map shown in FIG. 12 based on a slip amount of a high clutch 33. FIG. 12 is the map showing a relationship between the slip amount and the change amount of the speed ratio. The change amount of the speed ratio increases with an increase in the slip amount. The change amount of the speed ratio is a change amount toward a high side in the variator 20.

In Step S306, the control unit 120 changes a second predetermined speed ratio by subtracting the change amount calculated in Step S305 from the second predetermined speed ratio at the time of starting the current coast stop control. That is, a predetermined speed ratio region is narrowed by changing the second predetermined speed ratio toward the high side. By this, the next coast stop control is executed at a speed ratio higher than the speed ratio at the time of starting the current coast stop control. For example, if the second predetermined speed ratio is set to be lowest and the speed ratio at the time of starting the coast stop control is lowest, the predetermined speed ratio region is changed from a region between the first predetermined speed ratio and the lowest speed ratio to a region between the first predetermined speed ratio and a speed ratio obtained by subtracting the change amount from the lowest speed ratio. That is, a coast stop execution region relating to the speed ratio is narrowed from the next time on.

As shown in FIG. 5, a reaction force received by a turbine shaft increases with an increase in the rotation speed of the turbine shaft. Accordingly, the control unit 120 reduces the rotation speed of the turbine shaft and suppresses the occurrence of a slip in the high clutch 33 by changing the speed ratio of the variator 20 at the time of starting the coast stop control toward the high side.

In Step S307, the coast stop control is finished.

It should be noted that the control unit 120 stores the newly set predetermined speed ratio region until the ignition switch is turned off. By this, the occurrence of a slip in the high clutch 33 can be suppressed without executing the coast stop control at the speed ratio at which the slip occurred in the high clutch 33.

Effects of the third embodiment of the present invention are described.

If a slip occurs in the high clutch 33 during the coast stop control, the second predetermined speed ratio is changed toward the high side to narrow the predetermined speed ratio region toward the high side. By this, the speed ratio of the variator 20 at the time of starting the next and subsequent coast stop controls becomes higher than the speed ratio at which the slip occurred in the high clutch 33. Thus, the reaction force received by the turbine shaft can be reduced by reducing the rotation speed of the turbine shaft during the coast stop control, whereby the occurrence of a slip in the high clutch 33 can be suppressed.

A vehicle deceleration, a road surface gradient or the like can also be used as a coast stop condition. For example, if a slip occurs in the high clutch 33, a permissible vehicle deceleration is reduced or a permissible road surface gradient is reduced.

Further, although the high clutch 33 has been described to be engaged during the coast stop control in the above embodiments, there is no limitation to this and the low brake 32 or a frictional engagement element other than the sub-transmission mechanism 30 may be engaged.

The above embodiments may be combined.

Although the embodiments of the present invention have been described above, the above embodiments are only an illustration of some application examples of the present invention and not intended to limit the technical scope of the present invention to the specific configurations of the above embodiments.

This application claims a priority of Japanese Patent Application No. 2011-188283 filed with the Japan Patent Office on Aug. 31, 2011, all the contents of which are hereby incorporated by reference.

The invention claimed is:

1. A coast stop vehicle, comprising:
a power transmission unit provided between a drive source and drive wheels;
a drive source automatic stop unit configured to stop the drive source during vehicle running when a value indicating a driving state of the vehicle is in a drive source stop permission region;
a slip determination unit configured to determine whether or not there is a slip in the power transmission unit while the drive source is stopped by the drive source automatic stop unit; and
a changer unit configured to narrow the drive source stop permission region when the occurrence of the slip in the power transmission unit was determined by the slip determination unit.

2. The coast stop vehicle according to claim 1, wherein:
the drive source stop permission region is specified at least based on a vehicle speed,
the drive source automatic stop unit stops the drive source during the vehicle running when the vehicle speed is lower than a predetermined vehicle speed; and
the changer unit sets the predetermined vehicle speed to be lower than the predetermined vehicle speed at which the occurrence of the slip was determined when the occurrence of the slip was determined.

3. The coast stop vehicle according to claim 1, wherein:
the drive source stop permission region is specified at least based on an oil temperature,
the drive source automatic stop unit stops the drive source during the vehicle running when the oil temperature is not lower than a predetermined oil temperature; and
the changer unit sets the predetermined oil temperature to be higher than the predetermined oil temperature at which the occurrence of the slip was determined when the occurrence of the slip was determined.

4. The coast stop vehicle according to claim 1, comprising:
a variator arranged between the drive source and the drive wheels and capable of continuously changing a speed ratio between the drive source and the drive wheels, wherein:
the drive source stop permission region is specified at least based on a speed ratio of the variator,
the drive source automatic stop unit stops the drive source during the vehicle running when the speed ratio of the variator is in a speed ratio region between a first predetermined speed ratio and a second predetermined speed ratio larger than the first predetermined speed ratio; and the changer unit sets the second predetermined speed ratio to be smaller than the second predetermined speed ratio at which the occurrence of the slip was determined when the occurrence of the slip was determined.

5. The coast stop vehicle according to claim 1, wherein:

the changer unit further changes the changed drive source stop permission region when the occurrence of the slip was determined by the slip determination unit after the drive source stop permission region was changed.

6. The coast stop vehicle according to claim 1, wherein:

the changer unit increases a change amount with an increase in a slip amount of the power transmission unit.

7. The coast stop vehicle according to claim 1, comprising:

a deceleration detection unit configured to detect a deceleration of the vehicle, wherein:

the changer unit does not change the drive source stop permission region even upon the occurrence of the slip when the deceleration is higher than a predetermined deceleration and the vehicle is suddenly decelerated.

8. The coast stop vehicle according to claim 1, wherein:

the changer unit stores the drive source stop permission region after a change until an ignition switch is turned off.

9. A control method for controlling coast stop vehicle including power transmission unit provided between a drive source and drive wheels, the control method comprising:

stopping the drive source during vehicle running when a value indicating a driving state of the vehicle is in a drive source stop permission region;

determining whether or not there is a slip in the power transmission unit while the drive source is stopped; and narrowing the drive source stop permission region when the occurrence of the slip in the power transmission unit was determined.

10. A coast stop vehicle, comprising:

power transmission unit provided between a drive source and drive wheels;

drive source automatic stop means for stopping the drive source during vehicle running when a value indicating a driving state of the vehicle is in a drive source stop permission region;

slip determination means for determining whether or not there is a slip in the power transmission means while the drive source is stopped by the drive source automatic stop means; and changer means for narrowing the drive source stop permission region when the occurrence of the slip in the power transmission means was determined by the slip determination means.

* * * * *